(12) United States Patent
Kusafuka et al.

(10) Patent No.: US 11,882,268 B2
(45) Date of Patent: Jan. 23, 2024

(54) HEAD-UP DISPLAY SYSTEM AND MOVABLE OBJECT

(71) Applicant: KYOCERA CORPORATION, Kyoto (JP)

(72) Inventors: Kaoru Kusafuka, Tokyo (JP); Sunao Hashimoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 169 days.

(21) Appl. No.: 17/614,501

(22) PCT Filed: May 29, 2020

(86) PCT No.: PCT/JP2020/021440
§ 371 (c)(1),
(2) Date: Nov. 26, 2021

(87) PCT Pub. No.: WO2020/241863
PCT Pub. Date: Dec. 3, 2020

(65) Prior Publication Data
US 2022/0232202 A1    Jul. 21, 2022

(30) Foreign Application Priority Data

May 30, 2019  (JP) ................. 2019-101574

(51) Int. Cl.
*B60K 35/00*  (2006.01)
*G02B 30/32*  (2020.01)
(Continued)

(52) U.S. Cl.
CPC .......... *H04N 13/398* (2018.05); *B60K 35/00* (2013.01); *G02B 27/0101* (2013.01);
(Continued)

(58) Field of Classification Search
CPC .... B60K 2370/1529; B60K 2370/1531; B60K 2370/23; B60K 2370/48; B60K 2370/52;
(Continued)

(56) References Cited

U.S. PATENT DOCUMENTS

2012/0224062 A1    9/2012  Lacoste et al.
2014/0152926 A1    6/2014  Takahashi
(Continued)

FOREIGN PATENT DOCUMENTS

CN    103852949 A    6/2014
EP    3296794 A1    3/2018
(Continued)

*Primary Examiner* — Daquan Zhao
(74) *Attorney, Agent, or Firm* — HAUPTMAN HAM, LLP (57) ABSTRACT

A head-up display system includes a three-dimensional display device, an optical member, and an accelerometer. The three-dimensional display device includes a display panel, an optical element, and a controller. The display panel displays an image. The optical element defines a traveling direction of image light emitted from the display panel. The optical member reflects the image light from the three-dimensional display device toward a user's eye. The optical member is at a fixed position relative to the three-dimensional display device. The accelerometer detects acceleration of the three-dimensional display device. The controller controls a position of the image on the display panel based on the acceleration.

7 Claims, 10 Drawing Sheets

(51) Int. Cl.
*H04N 13/31* (2018.01)
*H04N 13/398* (2018.01)
*H04N 13/383* (2018.01)
*G02B 27/01* (2006.01)

(52) U.S. Cl.
CPC ......... *G02B 27/0179* (2013.01); *G02B 30/32* (2020.01); *H04N 13/31* (2018.05); *H04N 13/383* (2018.05); *B60K 2370/1529* (2019.05); *B60K 2370/23* (2019.05); *G02B 2027/0134* (2013.01); *G02B 2027/0183* (2013.01)

(58) Field of Classification Search
CPC ............ B60K 35/00; G02B 2027/0134; G02B 2027/0183; G02B 27/0101; G02B 27/0179; G02B 30/32; H04N 13/31; H04N 13/383; H04N 13/398
USPC .......................................... 348/42, 51, 53, 61
See application file for complete search history.

(56) References Cited

U.S. PATENT DOCUMENTS

| | | |
|---|---|---|
| 2014/0267242 A1 | 9/2014 | Uehara |
| 2016/0216521 A1 | 7/2016 | Yachida et al. |
| 2018/0205944 A1 | 7/2018 | Seo et al. |
| 2018/0239152 A1* | 8/2018 | Kuo .................. G02B 27/0149 |
| 2019/0139286 A1 | 5/2019 | Shimoda et al. |
| 2019/0377177 A1 | 12/2019 | Takahashi et al. |
| 2021/0055547 A1* | 2/2021 | Rao ....................... G06F 3/1423 |

FOREIGN PATENT DOCUMENTS

| | | |
|---|---|---|
| JP | 200121836 A | 1/2001 |
| JP | 201468331 A | 4/2014 |
| JP | 2014112757 A | 6/2014 |
| JP | 2014179750 A | 9/2014 |
| JP | 2018202920 A | 12/2018 |
| WO | 2015060193 A1 | 4/2015 |
| WO | 2018042898 A1 | 3/2018 |
| WO | 2018139611 A1 | 8/2018 |

* cited by examiner

HEAD-UP DISPLAY SYSTEM AND MOVABLE OBJECT

RELATED APPLICATIONS

The present application is a National Phase of International Application No. PCT/JP2020/021440, filed May 29, 2020, and claims priority based on Japanese Patent Application No. 2019-101574, filed May 30, 2019.

FIELD

The present disclosure relates to a head-up display system and a movable object.

BACKGROUND

A known head-up display apparatus allows a user aboard a vehicle to view a virtual image plane with image light entering the eyeballs of the user after the image light is transmitted through, for example, a liquid crystal panel in a projection unit and reflected from an optical member, such as a vehicle windshield. The head-up display apparatus detects the positions of the user's eyes and controls the mirror angle that defines the traveling direction of the image light based on the eye positions to allow image light to reach the user's eyes (Patent Literature 1).

However, a movable object incorporating such a head-up display apparatus may vibrate during traveling, causing vibration of a virtual image plane formed by the head-up display apparatus. A virtual image plane, which may form within the field of view of the user, appears vibrating to the user. To accurately see the virtual image plane, the user moves the viewpoint in accordance with the vibration and may view the virtual image plane in an uncomfortable manner. An apparatus is awaited to allow the user to view a virtual image plane in a comfortable manner.

CITATION LIST

Patent Literature

Patent Literature 1: WO 2018/042898

BRIEF SUMMARY

A head-up display system according to an aspect of the present disclosure includes a three-dimensional display device, an optical member, and an accelerometer. The three-dimensional display device includes a display panel, an optical element, and a controller. The display panel displays an image. The optical element defines a traveling direction of image light emitted from the display panel. The optical member reflects the image light from the three-dimensional display device toward a user's eye. The optical member is at a fixed position relative to the three-dimensional display device. The accelerometer detects acceleration of the three-dimensional display device. The controller controls a position of the image on the display panel based on the acceleration.

A movable object according to another aspect of the present disclosure includes a head-up display system. The head-up display system includes a three-dimensional display device, an optical member, and an accelerometer. The three-dimensional display device includes a display panel, an optical element, and a controller. The display panel displays an image. The optical element defines a traveling direction of image light emitted from the display panel. The optical member reflects the image light from the three-dimensional display device toward a user's eye. The optical member is at a fixed position relative to the three-dimensional display device. The accelerometer detects acceleration of the three-dimensional display device. The controller controls a position of the image on the display panel based on the acceleration.

BRIEF DESCRIPTION OF DRAWINGS

The objects, features, and advantages of the present disclosure will become more apparent from the following detailed description and the drawings.

DETAILED DESCRIPTION

An embodiment of the present disclosure will now be described with reference to the drawings. The drawings referred to hereafter are schematic and are not drawn to scale relative to the actual size of each component.

A head-up display system and a movable object according to one or more embodiments of the present disclosure allow a user to view a virtual image plane in a comfortable manner.

Figure 1:
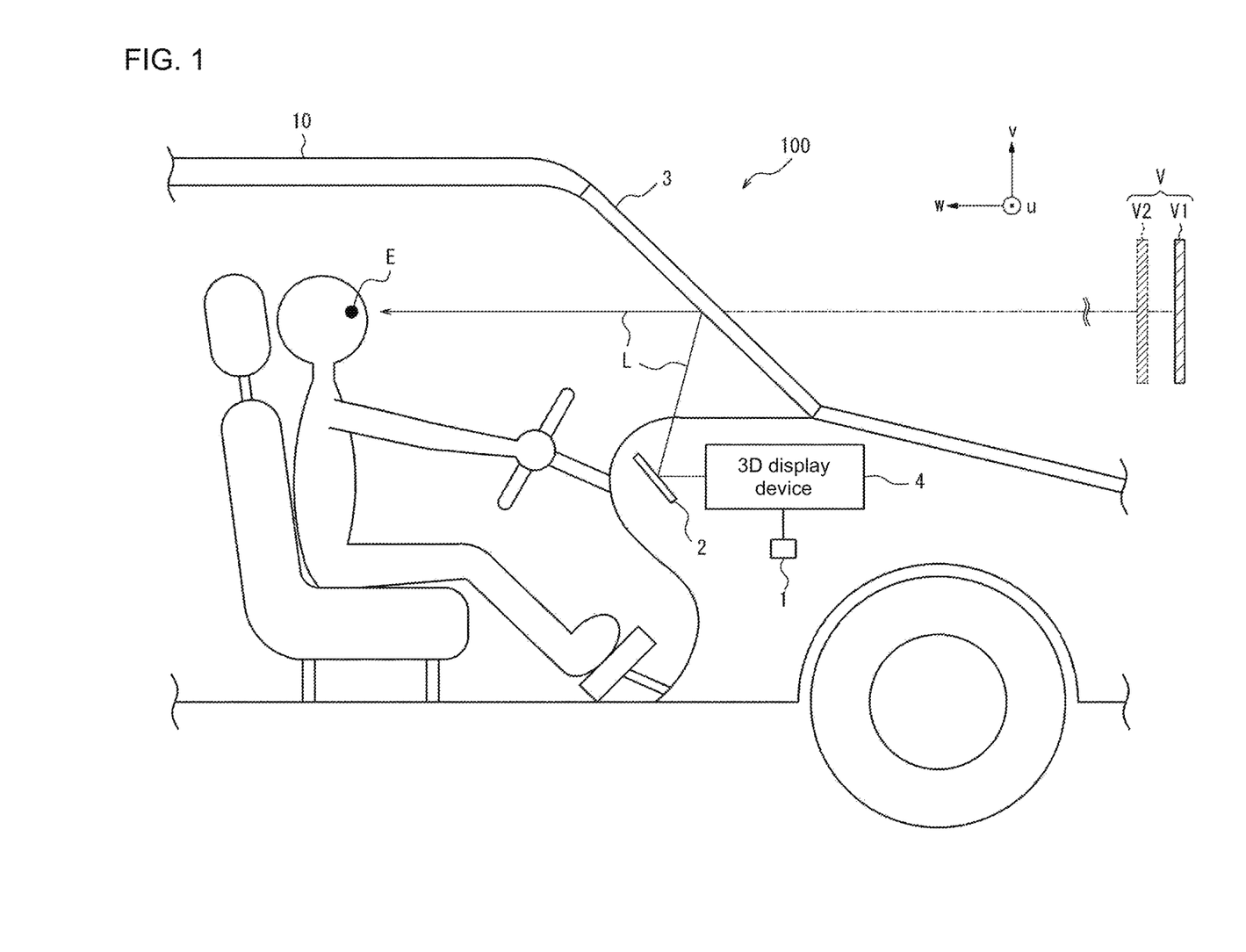
FIG. 1 is a diagram of an example movable object incorporating a head-up display (HUD) according to a first embodiment.

As shown in FIG. 1, a head-up display (HUD) system 100 according to an embodiment of the present disclosure includes an accelerometer 1, at least one reflector 2, an optical member 3, and a three-dimensional (3D) display device 4. The HUD system 100 is mounted on a movable object 10. The reflector 2 and the optical member 3 together may also be referred to as an optical system.

The movable object according to one or more embodiments of the present disclosure includes a vehicle, a vessel, or an aircraft. The vehicle according to one or more embodiments of the present disclosure includes, but is not limited to, an automobile or an industrial vehicle, and may also include a railroad vehicle, a community vehicle, or a fixed-wing aircraft traveling on a runway. The automobile includes, but is not limited to, a passenger vehicle, a truck, a bus, a motorcycle, or a trolley bus, and may also include another vehicle traveling on a road. The industrial vehicle includes an agricultural vehicle or a construction vehicle. The industrial vehicle includes, but is not limited to, a forklift or a golf cart. The agricultural vehicle includes, but is not limited to, a tractor, a cultivator, a transplanter, a binder, a combine, or a lawn mower. The construction vehicle includes, but is not limited to, a bulldozer, a scraper, a power shovel, a crane vehicle, a dump truck, or a road roller. The vehicle includes a man-powered vehicle. The classification of the vehicle is not limited to the above. For example, the automobile may include an industrial vehicle traveling on a road, and one type of vehicle may fall within a plurality of classes. The vessel according to one or more embodiments of the present disclosure includes a jet ski, a boat, or a tanker. The aircraft according to one or more embodiments of the present disclosure includes a fixed-wing aircraft or a rotary-wing aircraft.

The accelerometer 1 detects the acceleration of the 3D display device 4 incorporating the accelerometer 1 and transmits the detected acceleration to the 3D display device 4. The accelerometer 1 may be fixed to a housing for the 3D display device 4. The accelerometer 1 may be fixed to any component of the movable object 10 that fixes and incorporates the 3D display device 4. The accelerometer includes, but is not limited to, a mechanical accelerometer, an optical accelerometer, or a semiconductor accelerometer. The semiconductor accelerometer includes, for example, a piezoresistive accelerometer, a capacitive accelerometer, or a thermal accelerometer based on a gas temperature profile.

The reflector 2 is at a fixed position relative to the 3D display device 4. For example, the 3D display device 4 is at a fixed position relative to the movable object 10, and the reflector 2 is at a fixed position relative to the movable object 10. The reflector 2 is thus at a fixed position relative to the 3D display device 4.

The reflector 2 reflects image light emitted from the 3D display device 4 toward a predetermined area on the optical member 3. The predetermined area reflects image light toward the user's eyes. The predetermined area may be defined by the direction in which the user's eyes are located relative to the optical member 3 and the direction in which image light is incident on the optical member 3. The reflector 2 includes at least one reflective element.

The reflective element may be a mirror, such as a concave mirror. The reflective element may be one mirror as shown in FIG. 1, or may be a combination of two or more mirrors.

The optical member 3 is at a fixed position relative to the 3D display device 4. For example, the 3D display device 4 is at a fixed position relative to the movable object 10, and the optical member 3 is at a fixed position relative to the movable object 10. The optical member 3 is thus at a fixed position relative to the 3D display device 4.

The optical member 3 reflects image light emitted from the 3D display device 4 and reflected from the reflector(s) 2 toward the user's left eye (first eye) and the user's right eye (second eye). For example, the movable object 10 may include a windshield as the optical member 3. The HUD system 100 thus directs light emitted from the 3D display device 4 to the user's left and right eyes along an optical path L. The user views light reaching the eyes along the optical path L as a virtual image plane V.

Figure 2:
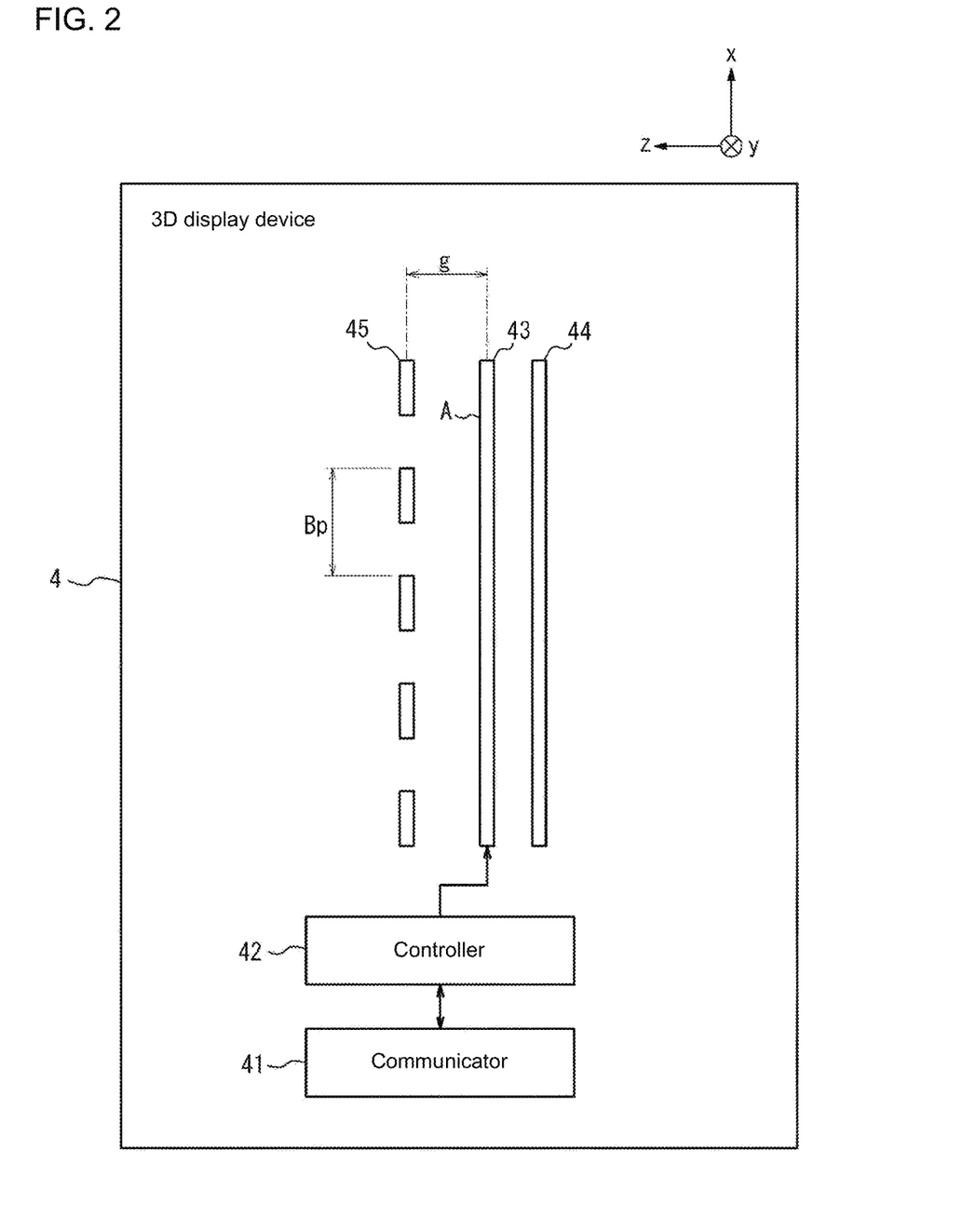
FIG. 2 is a schematic diagram of a three-dimensional (3D) display device shown in FIG. 1.

As shown in FIG. 2, the 3D display device 4 may include a communicator 41, a controller 42, a display panel 43, an illuminator 44, and a parallax barrier 45.

The communicator 41 can communicate with the accelerometer 1. The communicator 41 may communicate with the accelerometer 1 using a wireless communication standard, a mobile network wireless communication standard, or a wired communication standard. A short-range wireless communication standard may include, for example, Wi-Fi (registered trademark), Bluetooth (registered trademark), infrared communication, or near field communication (NFC). The mobile network wireless communication standard may include, for example, long term evolution (LTE), a fourth generation mobile communication system, or a fifth generation mobile communication system.

The communicator 41 receives the acceleration detected by the accelerometer 1.

The controller 42 may be connected to the components of the 3D display device 4 to control these components. The components controlled by the controller 42 include the communicator 41 and the display panel 43. The controller 42 may be, for example, a processor. The controller 42 may include one or more processors. The processors may include a general-purpose processor that reads a specific program and performs a specific function, and a processor dedicated to specific processing. The dedicated processor may include an application-specific integrated circuit (ASIC). The processor may include a programmable logic device (PLD). The PLD may include a field-programmable gate array (FPGA). The controller 42 may be either a system on a chip (SoC) or be a system in a package (SiP) in which one or more processors cooperate with other components.

The controller 42 performs various control operations based on the acceleration detected by the accelerometer 1 and received by the communicator 41. The control performed by the controller 42 will be described in detail later.

Figure 3:
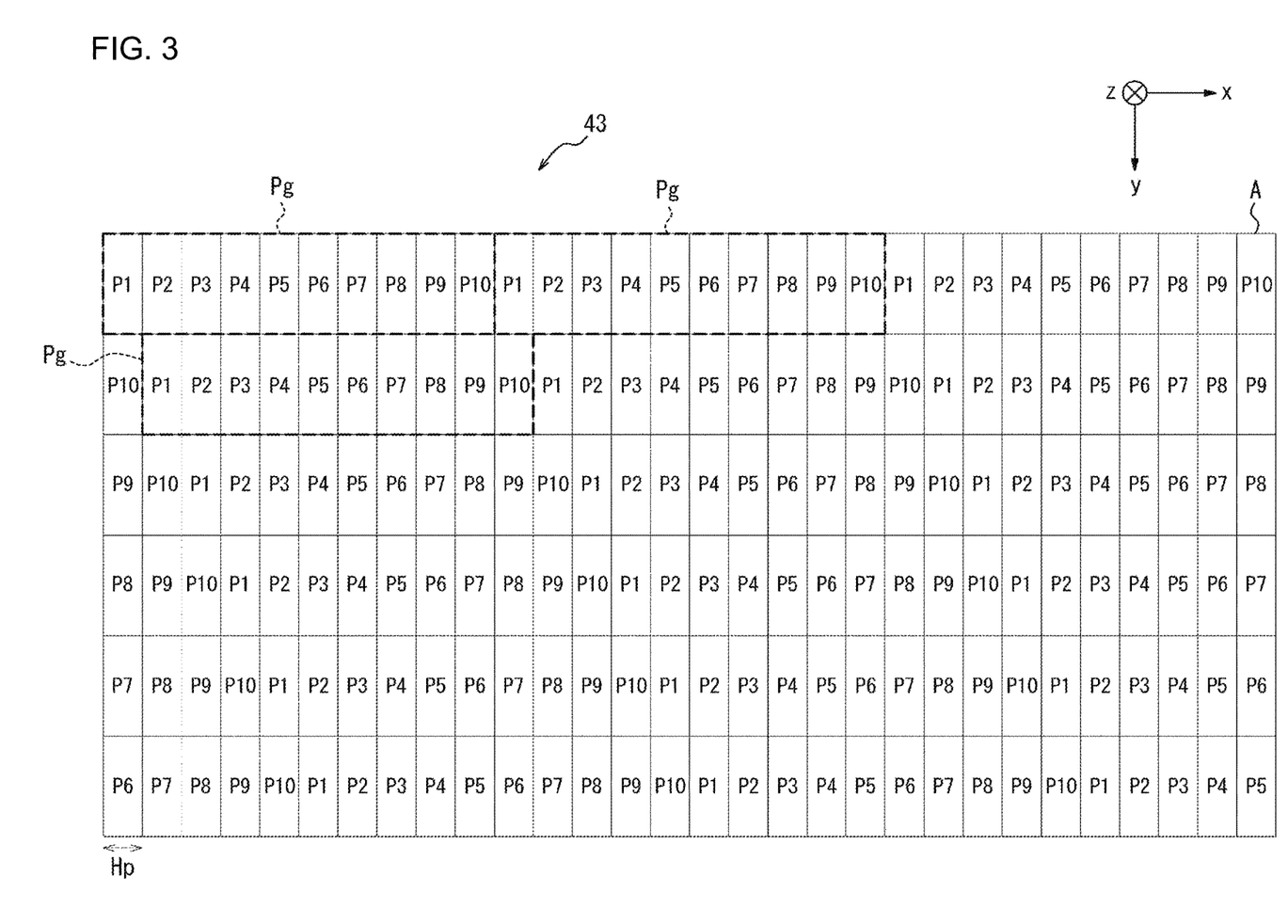
FIG. 3 is a diagram of an example display panel shown in FIG. 2 viewed in the depth direction.

As shown in FIG. 3, the display panel 43 includes a two-dimensional (2D) active area A including multiple divisional areas. The active area A is an area on which a parallax image appears. The parallax image includes a left-eye image (first image) and a right-eye image (second image) having parallax with the left-eye image. The left-eye image is viewed with the user's left eye (first eye). The right-eye image is viewed with the user's right eye (second eye). The divisional areas are defined in a first direction and in a second direction perpendicular to the first direction. The direction perpendicular to the first and second directions is referred to as a third direction. In the present embodiment, the first direction is defined as a horizontal direction, the second direction is defined as a vertical direction, and the third direction is defined as a depth direction. However, the first, second, and third directions are not limited to the directions referred to above. In the drawings, the first direction is written as x-direction, the second direction as y-direction, and the third direction as z-direction.

However, the first, second, and third directions are not limited to the directions referred to above. In FIGS. 2 to 4 and 10, the first direction is written as x-direction, the second direction as y-direction, and the third direction as z-direction. In FIGS. 1, 5, and 7 to 9 and hereafter, an interocular direction or the direction of a line passing through the user's right and left eyes is written as u-direction, and the front-rear direction as viewed from the user is written as w-direction. The height direction perpendicular to u-direction and w-direction is written as v-direction.

Each divisional area corresponds to a subpixel. Thus, the active area A includes multiple subpixels arranged in a grid in the horizontal and vertical directions.

Each subpixel may correspond to one of red (R), green (G), and blue (B). A set of three subpixels colored R, G, and B may form a pixel. A pixel may be referred to as a picture element. The display panel 43 is not limited to a transmissive liquid crystal panel but may be another display panel such as an organic electroluminescent (EL) display. For the display panel 43 being a self-luminous display panel, the 3D display device 4 may eliminate the illuminator 44.

As described above, multiple subpixels arranged in the active area A form subpixel groups Pg. The subpixel groups Pg each include a predetermined number of subpixels in rows and columns. In the example shown in FIG. 3, the subpixel groups Pg each include (2×n×b) subpixels P1 to P(2×n×b), which are consecutively arranged in b row(s) in the vertical direction and in 2×n columns in the horizontal direction. In the example shown in FIG. 3, the subpixel groups Pg are repeatedly arranged in the horizontal direction. The subpixel groups Pg are repeatedly arranged in the vertical direction at positions shifted by one subpixel in the horizontal direction from the corresponding subpixels. In the present embodiment, n=5 and b=1 are satisfied, for example. As shown in FIG. 3, the active area A includes the subpixel groups Pg each including ten consecutive subpixels P1 to P10 arranged in one row in the vertical direction and in ten columns in the horizontal direction. Each of symbols P1 to P10 is identification information for the corresponding subpixel. In FIG. 3, some of the subpixel groups Pg are denoted by reference signs.

Each subpixel group Pg is the smallest unit controllable by the controller 42 (described later) to display an image. The subpixels included in each subpixel group Pg are identified using the identification information P1 to P(2×n×b). The subpixels P1 to P(2×n×b) included in each subpixel group Pg with the same identification information are controlled by the controller 42 at the same time. For example, the controller 42 switches the image to be displayed by the subpixels P1 from the left-eye image to the right-eye image at the same time in all the subpixel groups Pg.

The illuminator 44 may illuminate a surface of the display panel 43. The illuminator 44 may include a light source, a light guide plate, a diffuser plate, and a diffuser sheet. The illuminator 44 emits illumination light using the light source, and spreads the illumination light uniformly for illuminating the surface of the display panel 43 using, for example, the light guide plate, the diffuser plate, and the diffusion sheet. The illuminator 44 may emit uniform light toward the display panel 43. The display panel 43 being a liquid crystal panel will now be described.

As shown in FIG. 2, the parallax barrier 45 is planar along the active area A, and is arranged at a predetermined distance (gap) g from the active area A. The parallax barrier 45 may be located opposite to the illuminator 44 from the display panel 43. The parallax barrier 45 may be located between the display panel 43 and the illuminator 44.

Figure 4:
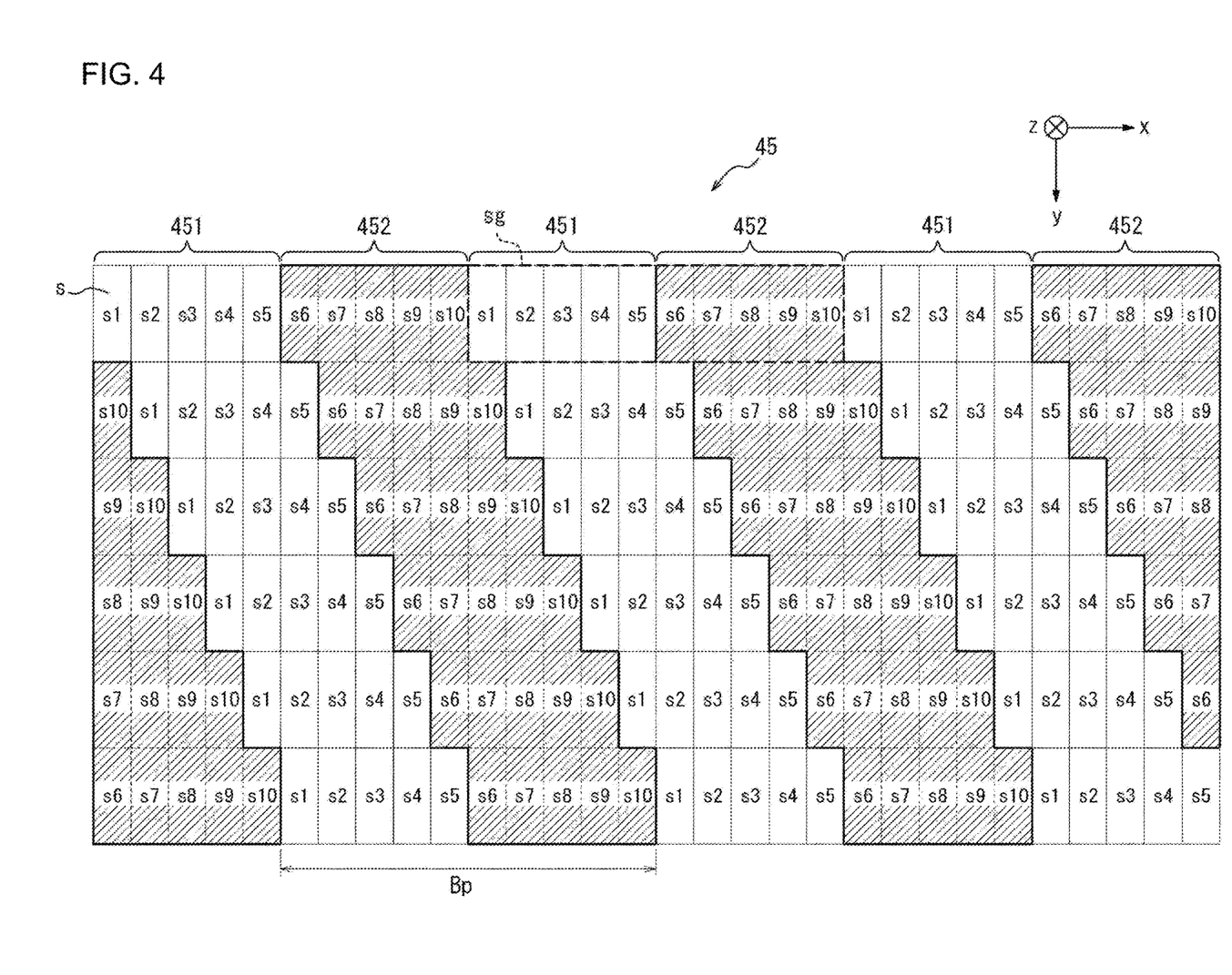
FIG. 4 is a diagram of an example parallax barrier shown in FIG. 2 viewed in the depth direction.

As shown in FIG. 4, the parallax barrier 45 includes multiple barrier areas s arranged in a grid in the horizontal and vertical directions. The barrier areas s included in the parallax barrier 45 form barrier area groups sg. The barrier area groups sg each include a predetermined number of barrier areas in the horizontal and vertical directions. More specifically, the barrier area groups sg each include (2×n×b) barrier areas s1 to s(2×n×b), which are consecutively arranged in b row(s) in the vertical direction and in 2×n columns in the horizontal direction. The barrier area groups sg are arranged to correspond to the arrangement of the subpixels in the subpixel groups Pg. The barrier area groups sg are repeatedly arranged in the horizontal direction. The barrier area groups sg are repeatedly arranged in the vertical direction at positions shifted by one barrier area in the horizontal direction from the corresponding barrier areas.

For n=5 and b=1 as described above, each barrier area group sg includes ten consecutive barrier areas s1 to s10 arranged in one row in the vertical direction and in ten columns in the horizontal direction. In FIG. 4, some of the barrier area groups sg are denoted with reference numerals.

Each barrier area group sg may include (2×n'×b') barrier areas s1 to s(2×n'×b'), which are consecutively arranged in b' (b' b) row(s) in the vertical direction and in 2×n' (n' n) columns in the horizontal direction.

As shown in FIG. 4, the parallax barrier 45 includes, for example, multiple attenuation areas 452 in which image light is attenuated. Each attenuation area 452 includes multiple barrier area groups sg. The attenuation areas 452 define transmissive areas 451 between adjacent attenuation areas 452. The transmissive areas 451 have a higher light transmittance than the attenuation areas 452.

A virtual image plane barrier pitch, VBp, which is the barrier pitch of a second virtual image plane V2 corresponding to the interval between the transmissive areas 451 in the horizontal direction, and a virtual image plane gap, Vg, which is the gap or distance between the second virtual image plane V2 and a first virtual image plane V1, are defined to satisfy Formulas 1 and 2 below.

$$E:Vd=(n \times VHp):Vg \tag{1}$$

$$Vd:VBp=(Vd+Vg):(2 \times n \times VHp) \tag{2}$$

where Vd is the proper viewing distance between the second virtual image plane V2 corresponding to the parallax barrier 45 and the user's right and left eyes, and E is the interocular distance between the user's right and left eyes. The interocular distance E may be, for example, a distance of 61.1 to 64.4 mm, which is calculated through studies performed by the National Institute of Advanced Industrial Science and Technology. In the formulas, VHp is the dimension of the virtual image for the subpixels on the first virtual image plane V1 in the direction (u-direction) corresponding to the first direction.

Image light emitted from the active area A on the display panel 43 is thus partly transmitted through the transmissive areas 451, reflected from the reflector(s) 2 to reach the optical member 3, reflected from the optical member 3, and then reaches the user's eyes as shown in FIG. 1.

Figure 5:
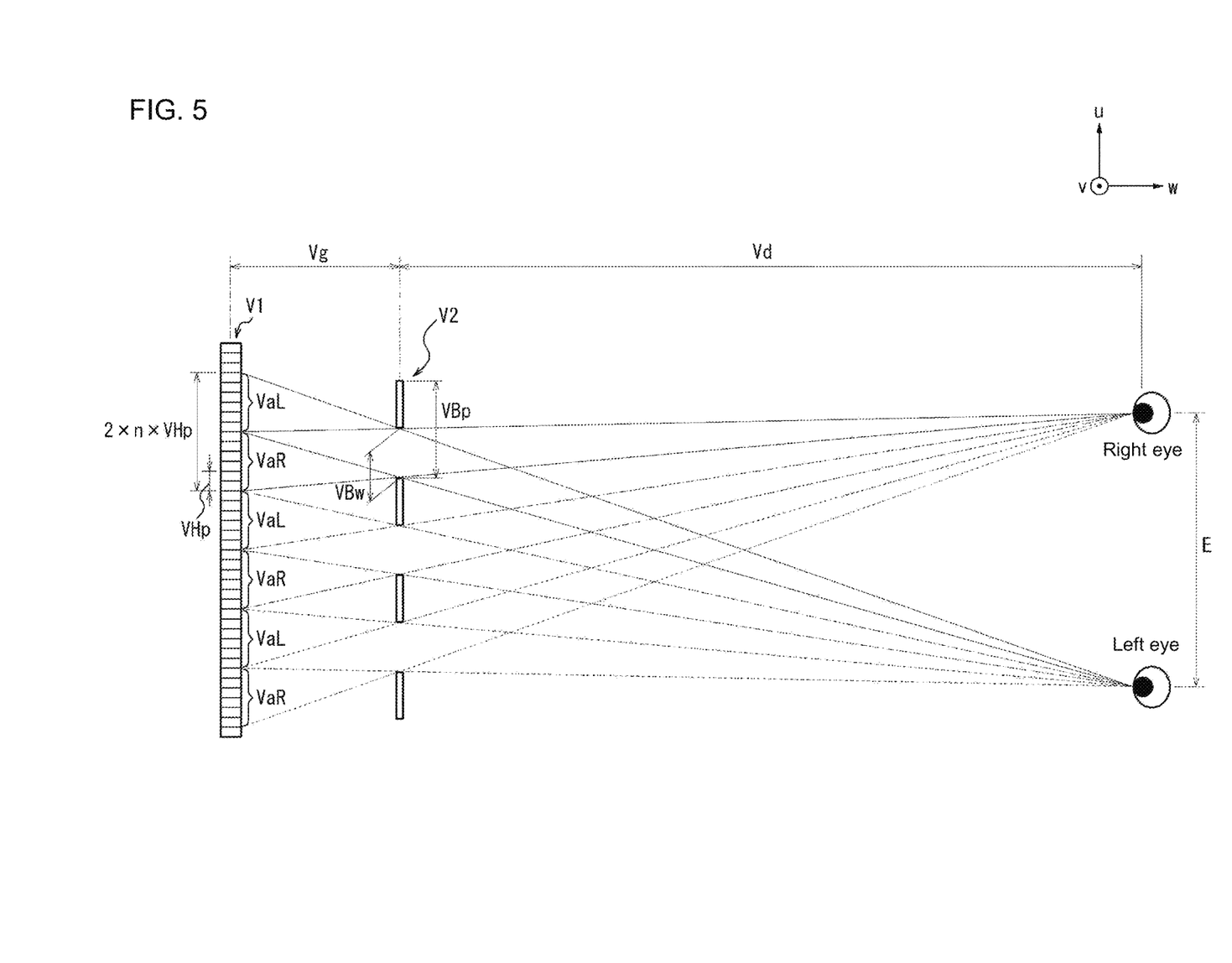
FIG. 5 is a diagram describing the relationship between a virtual image and a user's eyes shown in FIG. 1.

As shown in FIG. 5, the parallax barrier 45 defines the traveling direction of image light to define the area of the first virtual image plane V1 corresponding to the active area A viewable with the user's eyes. The user thus sees the parallax image appearing as the first virtual image plane V1 corresponding to the display panel 43 through the second virtual image plane V2, which is a virtual image corresponding to the parallax barrier 45. In reality, the user does not see the second virtual image plane V2 corresponding to the parallax barrier 45.

The areas in the first virtual image plane V1 viewable by the user with image light reaching the positions of the user's eyes are hereafter referred to as viewable areas Va. The areas in the first virtual image plane V1 viewable by the user with image light reaching the position of the user's left eye are referred to as left viewable areas VaL (first viewable areas). The areas in the first virtual image plane V1 viewable by the user with image light reaching the position of the user's right eye are referred to as right viewable areas VaR (second viewable areas).

The parallax barrier 45 may include, for example, a liquid crystal shutter. The liquid crystal shutter may control the light transmittance in accordance with a voltage applied. The liquid crystal shutter may include multiple pixels and control the light transmittance for each pixel.

The control performed by the controller 42 will now be described in detail.

The controller 42 causes the display panel 43 to display an image. More specifically, the controller 42 may cause the display panel 43 to display an image based on image data received by the communicator 41. The controller 42 may cause the display panel 43 to display an image based on image data stored in a memory included in the 3D display device 4. The controller 42 may cause the display panel 43 to display an image based on image data input with an input interface included in the 3D display device 4.

The controller 42 causes the display panel 43 to display an image by controlling the position of the image appearing on the display panel 43 based on the acceleration detected by the accelerometer 1.

More specifically, the controller 42 first calculates a distance $L_1(t)$ by which the 3D display device 4 is displaced from time $t_0$ to time t based on acceleration $\alpha(t)$ received by the communicator 41 from the accelerometer 1. For example, the controller 42 may calculate the distance $L_1(t)$ using Formula 3 by double integration of the acceleration $\alpha(t)$ from time $t_0$ to time t.

$$L_1(t) = \iint_{t_0}^{t} \alpha(t) d^2 t \qquad (3)$$

Figure 6:
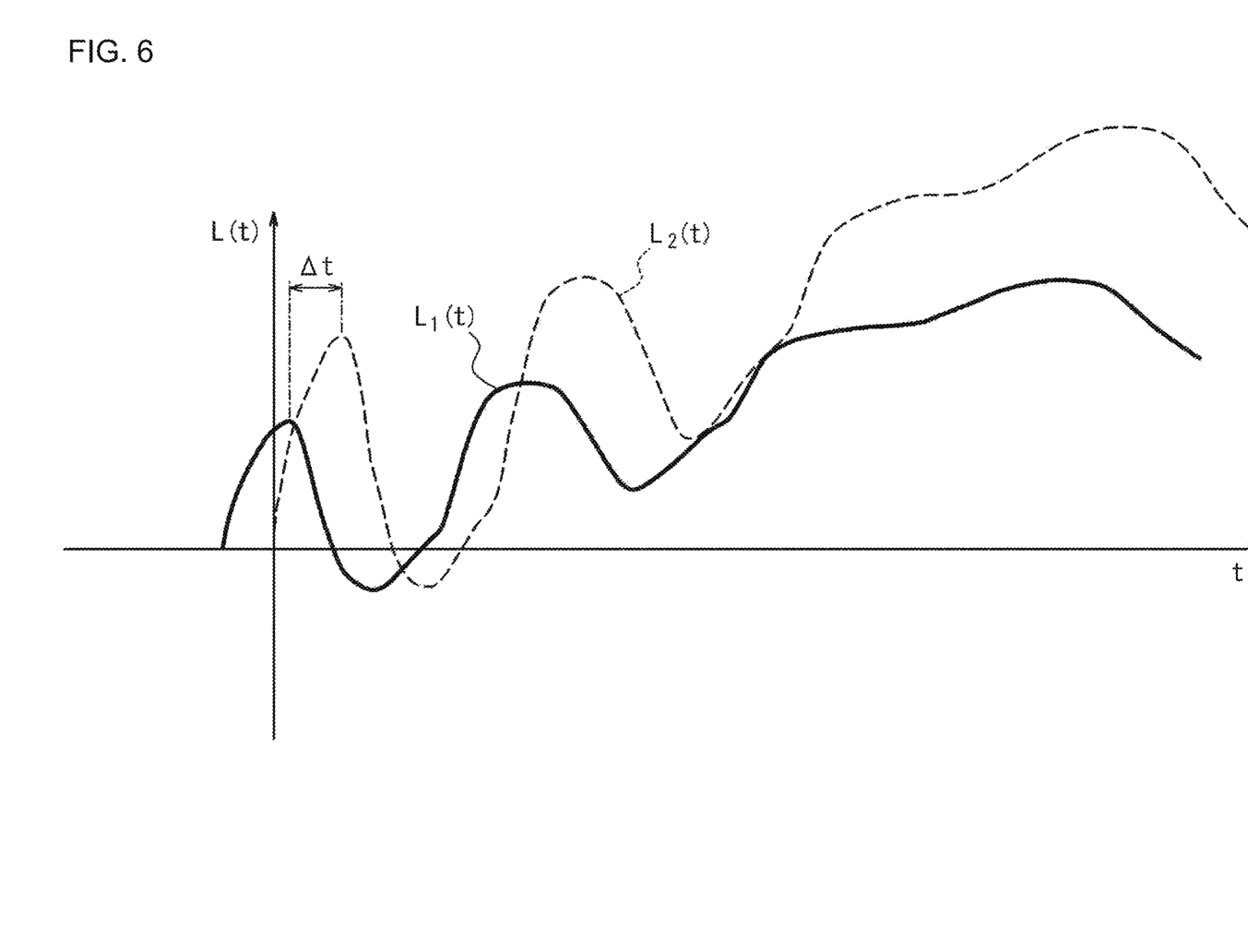
FIG. 6 is a graph showing the displacements of the 3D display device and the user's eye with time.

The controller 42 estimates a distance $L_2(t)$ by which the user's eye is displaced from time $t_0$ to time t based on the acceleration $\alpha(t)$ received by the communicator 41 from the accelerometer 1. The inventor and others have noticed that the user aboard the movable object 10 incorporating the 3D display device 4 may be affected by, for example, cushioning of the seat, and displaced at a time delayed by a predetermined period $\Delta t$ from when the movable object 10 is displaced and at a predetermined ratio r relative to the displacement of the movable object 10. The 3D display device 4 is at a fixed position relative to the movable object 10 as described above. As shown in FIG. 6, the user's eye is thus displaced at a time delayed by the predetermined period $\Delta t$ from when the 3D display device 4 is displaced. The user's eye is displaced by the distance $L_2(t)$ at the predetermined ratio r to the distance $L_1(t)$ by which the 3D display device 4 is displaced. The controller 42 can use, for example, Formula 4 to estimate the distance $L_2(t)$ by which the user's eye is displaced based on the acceleration $\alpha(t)$ received by the communicator 41 from the accelerometer 1.

$$L_2(t) = r \iint_{t_0}^{t} \alpha(t - \Delta t) d^2 t \qquad (4)$$

The predetermined period $\Delta t$ and the predetermined ratio r may be preset as appropriate based on, for example, the characteristics of the seat on the movable object 10 or the physical characteristics (e.g., the weight) of the user. For example, a shorter predetermined period $\Delta t$ may be set for a harder seat (with less cushioning). The predetermined ratio r may be set lower for a user with a greater weight. For an input from the user indicating the weight being in a first range, the predetermined ratio r may be set to r1. For an input indicating the weight being in a second range heavier than the first range, the predetermined ratio r may be set to r2 less than r1. The predetermined period $\Delta t$ and the predetermined ratio r may be set based on actual displacement measured for each user in response to displacement of the movable object 10.

The controller 42 may calculate the distance $L_1(t)$ by which the 3D display device 4 is displaced, estimate the distance $L_2(t)$ by which the user's eye is displaced, and then calculate a distance $\Delta L(t)$ by which the relative position of the user's eye relative to the 3D display device 4 is shifted. The distance $\Delta L(t)$ by which the relative position of the user's eye is shifted is the difference between the distance $L_1(t)$ and the distance $L_2(t)$ as shown in Formula 5.

$$\Delta L(t) = L_2(t) - L_1(t) \qquad (5)$$

Control Over Displacement in u- and v-Directions

Figure 7:
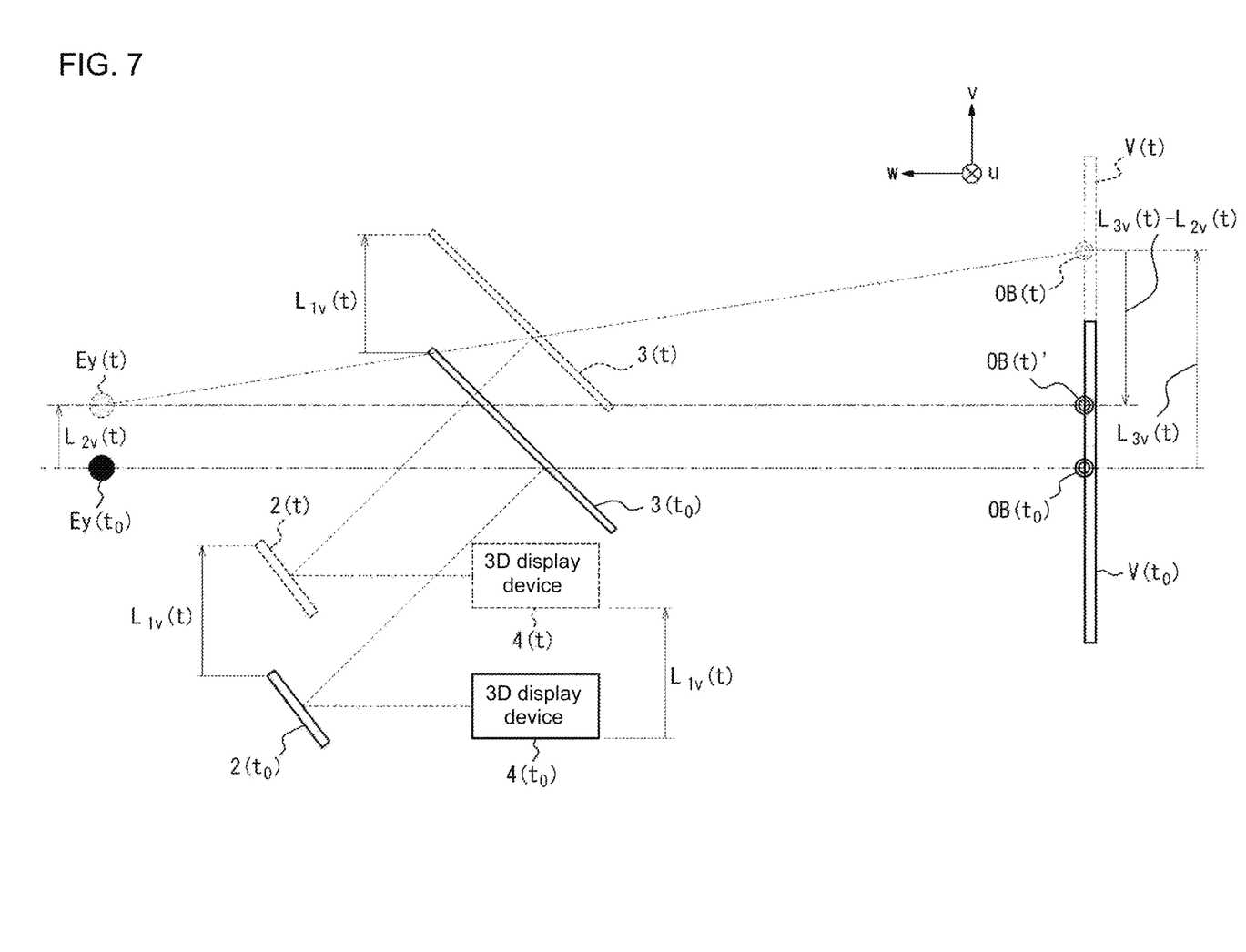
FIG. 7 is a diagram describing the positional relationship between the user's eye, a virtual image plane, an optical member, and the display device in v-direction.

The control over displacement of the virtual image plane V along the virtual image plane V (in u- and v-directions) performed by the controller 42 will now be described with reference to FIG. 7. The controller 42 may control the position of the image appearing on the display panel 43 to reduce the positional change of the virtual image plane V as viewed from the user. For example, the controller 42 may change the position of the parallax image on the display panel 43 to change the position of the virtual image in a direction opposite to the relative displacement direction of the virtual image plane V relative to the user's eye along the virtual image plane V. The control over the image in v-direction will now be described for displacement of the 3D display device 4 and the user's eye in v-direction. The distances by which the 3D display device 4 and the user's eye are displaced in v-direction are respectively denoted by $L_{1v}(t)$ and $L_{2v}(t)$. The control for u-direction can be performed similarly to that for v-direction and will not be described repeatedly.

As described above, the reflector 2 and the optical member 3 are each at a fixed position relative to the 3D display device 4. As shown in FIG. 7, for the 3D display device 4 displaced by the distance $L_{1v}(t)$ in v-direction from the position at time $t_0$ to the position at time t, the reflector 2 and the optical member 3 are each displaced by the distance $L_{1v}(t)$ in v-direction. In FIG. 7, Ey($t_0$), 4($t_0$), 2($t_0$), 3($t_0$), and V($t_0$) respectively denote the user's eye Ey, the 3D display device 4, the reflector 2, the optical member 3, and the virtual image plane V at time $t_0$. Ey(t), 4(t), 2(t), 3(t), and V(t) respectively denote the user's eye Ey, the 3D display device 4, the reflector 2, the optical member 3, and the virtual image plane V at time t.

For the user's eye Ey displaced by the distance $L_{2v}(t)$ from the position at time $t_0$ to the position at time t, the virtual image plane V is displaced by a distance $L_{3v}(t)$. As expressed by Formula 6, the distance $L_{3v}(t)$ is calculated using a distance Z between the optical member 3 and the user and a distance D between the virtual image plane V (first virtual image plane V1) and the user's eye. The distance D satisfies D=Vg+Vd, where Vg is the gap between the virtual image planes and Vd is the proper viewing distance as described with reference to FIG. 5. The distances Z and D are changed in response to a change in the relative position of the eye relative to the optical member 3, but the changes are negligible as compared with the distances Z and D. The distances Z and D are thus approximated to be constant for calculating the distance $L_{3v}(t)$.

$$L_{3v}(t) = \frac{D}{Z} \times (L_{1v}(t) - L_{2v}(t)) + L_{2v}(t) \qquad (6)$$

The relative position of the virtual image plane V(t) relative to the user at time t is shifted from the relative position of the virtual image plane V($t_0$) relative to the user at time to by a distance of $L_{3v}(t) - L_{2v}(t)$ in v-direction. The controller 42 changes the position of the image appearing on the display panel 43 to cause the virtual image on the virtual image plane V to appear at a position shifted by a distance of $L_{3v}(t) - L_{2v}(t)$ in a direction opposite to the direction in which the virtual image plane V is displaced as viewed from the user. In FIG. 7, OB($t_0$) denotes a virtual image OB of an object included in the virtual image plane V at time $t_0$. OB(t) denotes the virtual image OB of the object included in the virtual image plane V at time t for an image position unchanged by the controller 42. OB(t)' denotes the virtual image OB of the object included in the virtual image plane V at time t for an image position changed by the controller 42.

This structure reduces the change in the relative position of the virtual image relative to the user's eye along the virtual image plane in response to a change in the relative position of the 3D display device 4 relative to the user's eye due to the vibration of the movable object 10. The user can thus view the virtual image in a comfortable manner without largely moving the viewpoint along the virtual image plane to accurately see the image.

Control Over Displacement in w-Direction

The control over displacement of the virtual image plane V in a direction normal to the virtual image plane V (in w-direction) performed by the controller 42 will now be described with reference to FIGS. 8 and 9. The controller 42 controls the position of the image appearing on the display panel 43 to reduce the positional change of a stereoscopic image 3DI formed by the virtual image plane V as viewed from the user. For example, the controller 42 changes the parallax of the parallax image to change the position of the stereoscopic image 3DI formed by the virtual image plane V in the same direction as the relative displacement direction of the eye relative to the virtual image plane V in a direction normal to the virtual image plane V. The control over the image will now be described for displacement of the 3D display device 4 and the user's eye in w-direction. The distances by which the 3D display device 4 and the user's eye are displaced in w-direction are respectively denoted by $L_{1w}(t)$ and $L_{2w}(t)$.

As described above, the reflector 2 and the optical member 3 are each at a fixed position relative to the 3D display device 4. As shown in FIG. 8, for the 3D display device 4 displaced by the distance $L_{1w}(t)$ in w-direction from the position at time $t_0$ to the position at time t, the reflector 2, the optical member 3, and the virtual image plane V are each displaced by the distance $L_{1w}(t)$ in w-direction. The position of the virtual image plane V is determined by the positions of the 3D display device 4, the reflector 2, and the optical member 3. For the 3D display device 4, the reflector 2, and the optical member 3 each displaced by the distance $L_{1w}(t)$ in w-direction, the virtual image plane V is displaced by the distance $L_{1w}(t)$ in w-direction.

Figure 8:
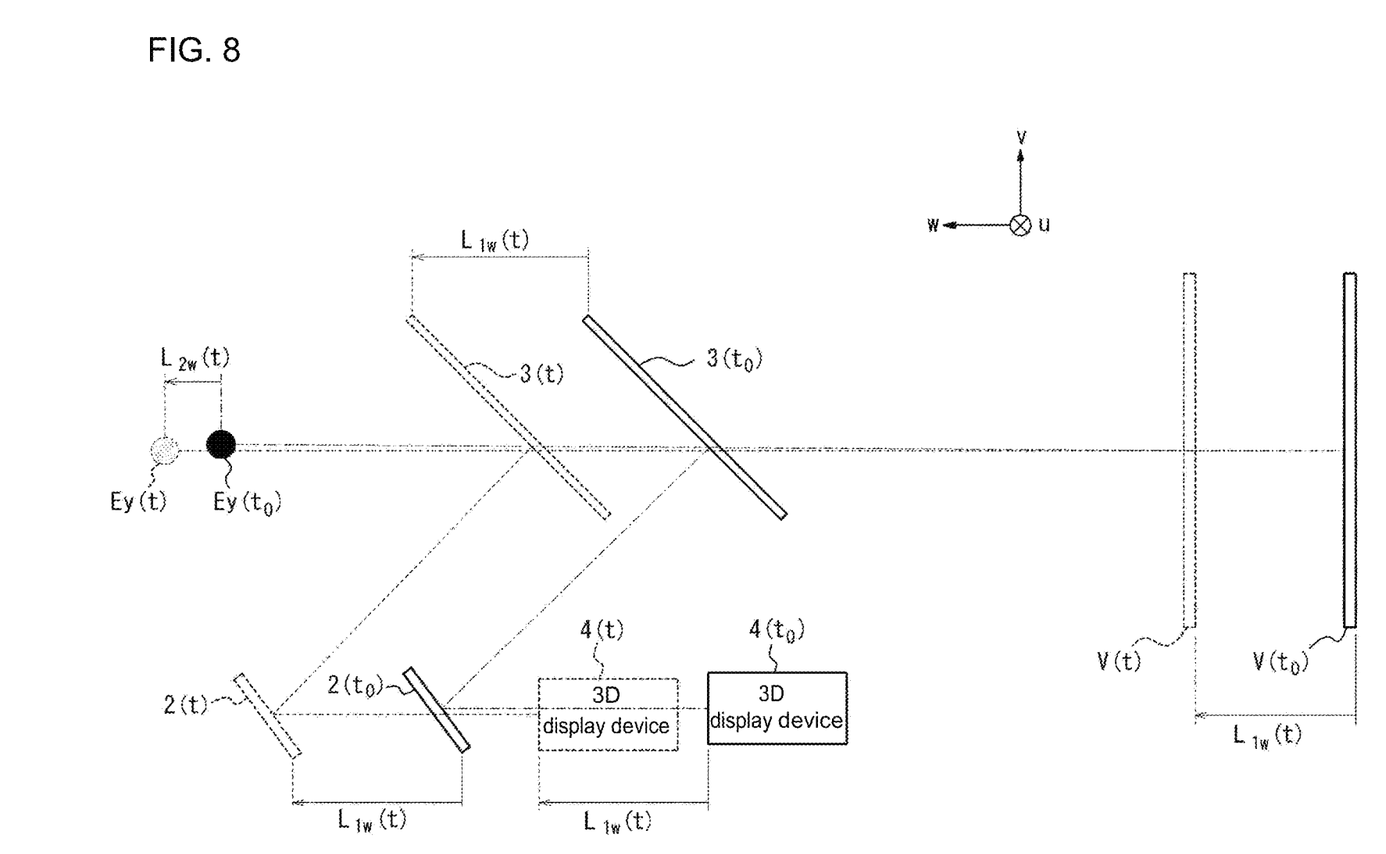
FIG. 8 is a diagram describing the positional relationship between the user's eye, the virtual image plane, the optical member, and the display device in w-direction.

In FIG. 8, Ey(to), $4(t_0)$, $2(t_0)$, $3(t_0)$, and $V(t_0)$ respectively denote the user's eye Ey, the 3D display device 4, the reflector 2, the optical member 3, and the virtual image plane V at time to. Ey(t), 4(t), 2(t), 3(t), and V(t) respectively denote the user's eye Ey, the 3D display device 4, the reflector 2, the optical member 3, and the virtual image plane V at time t.

For the user's eye Ey displaced by the distance $L_{2w}(t)$ and the virtual image plane V displaced by the distance $L_{1w}(t)$ from time $t_0$ to time t, the relative position of the user's eye Ey relative to the virtual image plane V is shifted by $L_{2w}(t)-L_{1w}(t)$. A system in which the virtual image plane V and the fixed optical member 3 are at rest will now be described with reference to FIG. 9. In FIG. 9, $3DI(t_0)$ denotes the stereoscopic image 3DI formed by the virtual image plane $V(t_0)$ at time to, 3DI(t) denotes the stereoscopic image 3DI formed by the virtual image plane V(t) at time t for an image position unchanged by the controller 42, and 3DI(t)' denotes the stereoscopic image 3DI formed by the virtual image plane V(t) at time t for an image position changed by the controller 42. In FIG. 9, $Ey(t_0)$ denotes the user's eye Ey at time $t_0$, and Ey(t) denotes the user's eye Ey at time t, similarly to FIG. 8.

Figure 9:
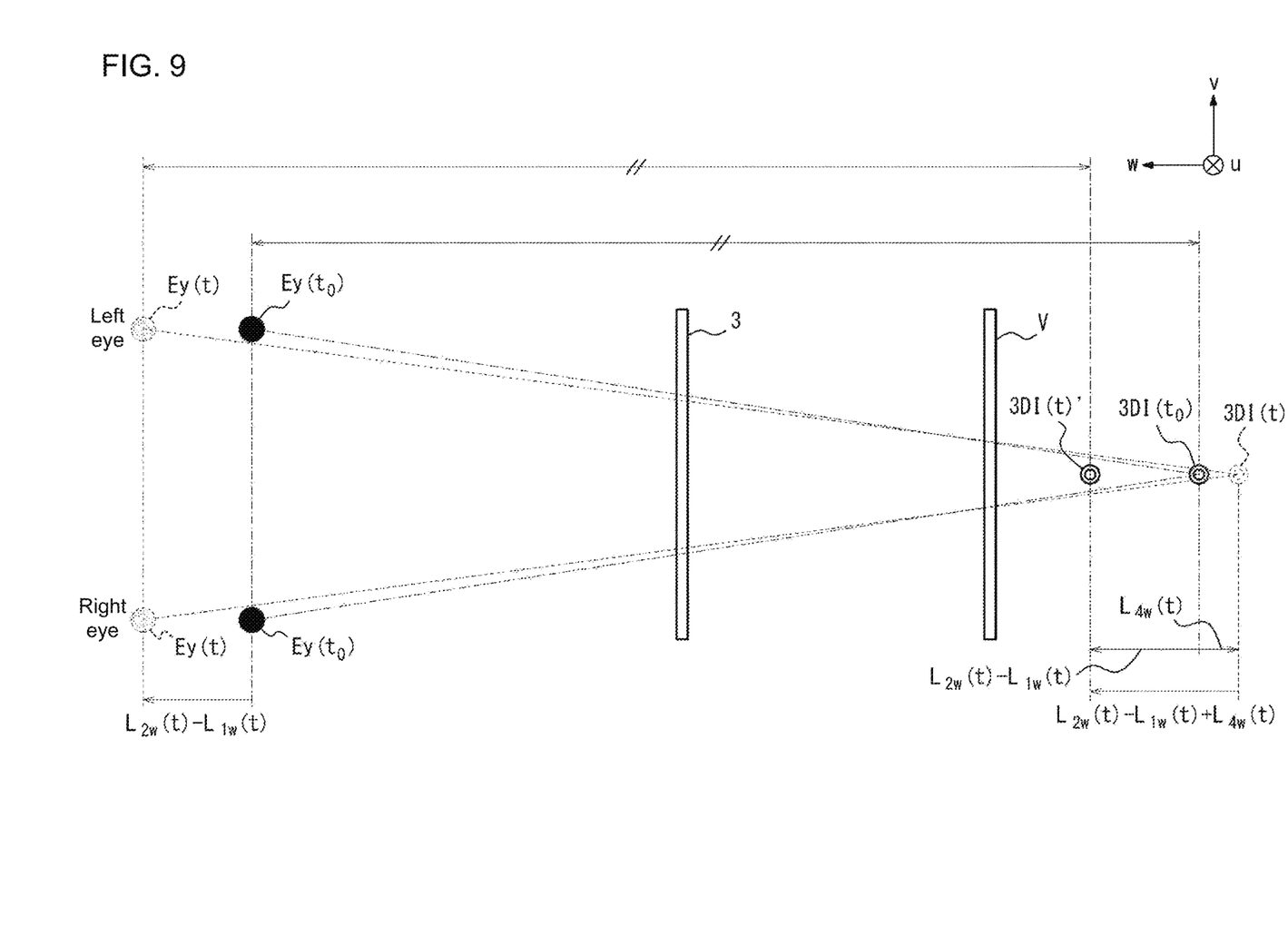
FIG. 9 is a diagram of the user's eye, the virtual image plane, and the optical member shown in FIG. 8 as viewed in u-direction.

In the system shown in FIG. 9, the virtual image plane V and the optical member 3 are at rest, and the user's eye is displaced by a distance of $L_{2w}(t)-L_{1w}(t)$. For a virtual parallax image on the virtual image plane V having parallax unchanged between time to and t, the user may be displaced relative to the virtual image plane V in a direction (w-direction) normal to the virtual image plane V. The user displacement then causes the stereoscopic image 3DI formed by the virtual image plane V to be displaced by $L_{4w}(t)$. More specifically, the user's eye displaced away from the virtual image plane V causes the stereoscopic image 3DI to be displaced away from the virtual image plane V. The user's eye displaced toward the virtual image plane V causes the stereoscopic image 3DI to be displaced toward the virtual image plane V.

The controller 42 may change the parallax of the parallax image on the display panel 43 to form a stereoscopic image 3DI(t)' resulting from displacement of the stereoscopic image 3DI(t) by a distance of $L_{2w}(t)-L_{1w}(t)+L_{4w}(t)$ in a direction opposite to the displacement direction of the stereoscopic image 3DI as viewed from the user. The controller 42 may use any known method to calculate the parallax based on the distance between the user's eye and the virtual image plane V and the distance between the user's eye and the stereoscopic image 3DI. The controller 42 may change the position of the parallax image on the display panel 43 to cause the parallax image to have the calculated parallax. This structure reduces the change from the relative position of the stereoscopic image $3DI(t_0)$ relative to the user's eye $Ey(t_0)$ to the relative position of the stereoscopic image 3DI(t) relative to the user's eye Ey(t). The user thus perceives a smaller displacement of the stereoscopic image 3DI in w-direction.

This structure reduces the change in the relative position of the virtual image relative to the user's eye in a direction normal to the virtual image plane in response to a change in the relative position of the 3D display device 4 relative to the user's eye due to the vibration of the movable object 10. The user can thus view the virtual image in a comfortable manner.

The controller 42 in the present embodiment may be an information processing apparatus such as a computer. The information processing apparatus includes a memory that stores a program describing the processes for implementing the functions of the controller 42 in the embodiment, and a processor that reads the program for execution.

As described above, the controller 42 in the present embodiment controls the position of the image on the display panel 43 based on the acceleration. The controller 42 can thus control the position of the image in accordance with a change in the relative position of the image relative to the user. This reduces the change in the relative positions of the virtual image plane V and the stereoscopic image 3DI relative to the user. The user can thus view the virtual image in a comfortable manner with less movement of the viewpoint in accordance with changes in the relative positions of the virtual image plane V and the stereoscopic image 3DI.

The structure according to one embodiment of the present disclosure allows the user to view the virtual image plane in a comfortable manner.

Although the above embodiments are described as typical examples, various modifications and substitutions to the embodiments are apparent to those skilled in the art without departing from the spirit and scope of the present disclosure. Thus, the above embodiments should not be construed to be restrictive, but may be variously modified or altered within the scope of the present disclosure. For example, multiple structural blocks described in the above embodiments may be combined into a structural block, or each structural block may be divided.

Figure 10:
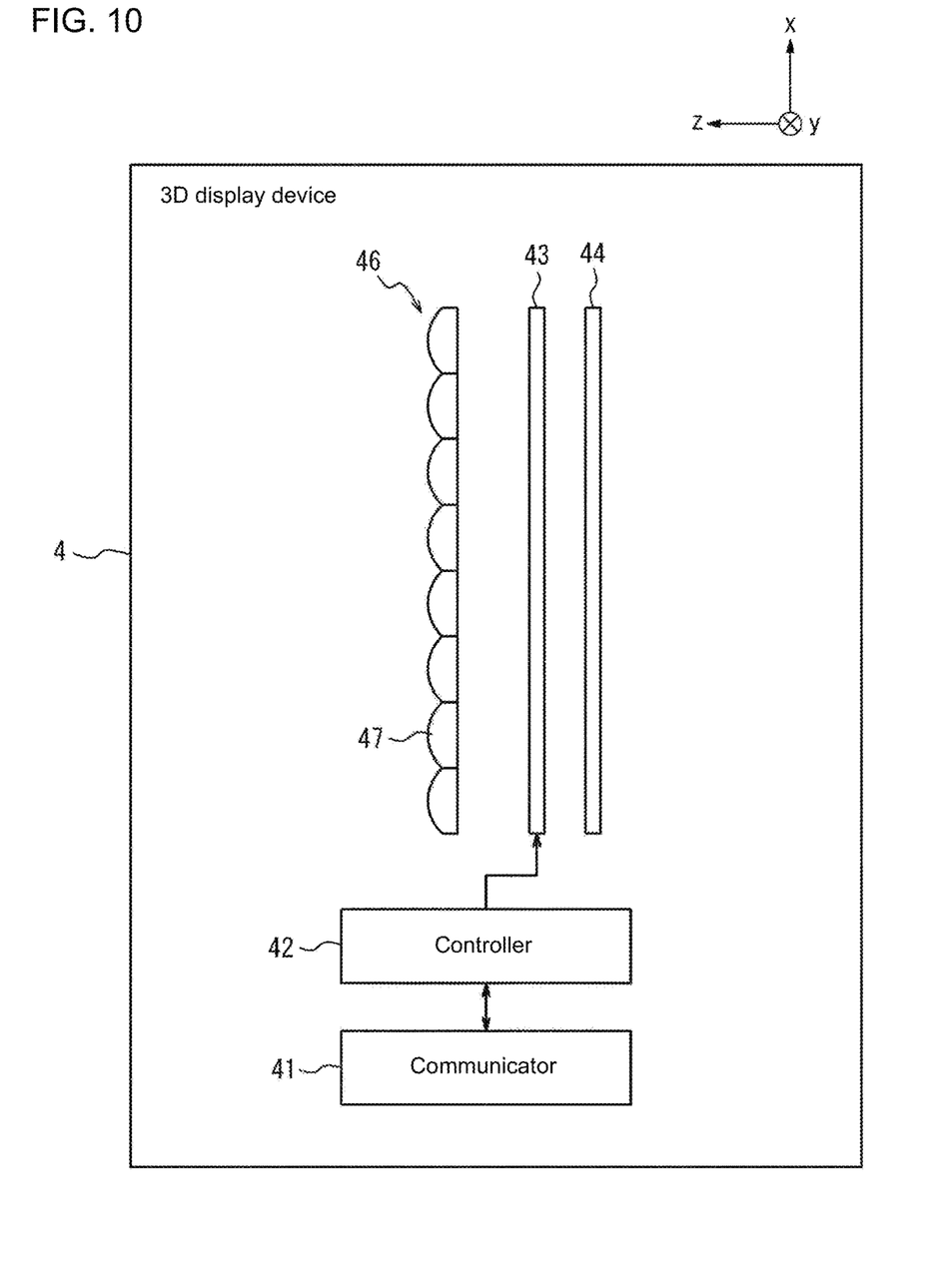
FIG. 10 is a diagram of a modification of the 3D display device shown in FIG. 1.

The optical element is not limited to the parallax barrier 45 as in the above embodiments. As shown in FIG. 10, the parallax barrier 45 may be replaced with, for example, a lenticular lens 46 as the optical element included in the 3D display device 4. The lenticular lens 46 is a horizontal array of cylindrical lenses 47 each extending vertically. The lenticular lens 46 defines the traveling direction of image light emitted from subpixels arranged in the active area A, similarly to the parallax barrier 45.

The elements in the present disclosure implement operations that are implementable. The operations implemented by the elements in the present disclosure can thus refer to the elements operable to implement the operations. The elements implementing operations in the present disclosure can be expressed as the elements operable to implement the operations. The operations implementable by the elements in the present disclosure can be expressed as elements including or having the elements operable to implement the operations. A first element causing a second element to implement an operation in the present disclosure can refer to the first element operable to cause the second element to perform the operation. A first element causing a second element to perform an operation in the present disclosure can be expressed as the first element operable to control the second element to perform the operation. Operations implemented by the elements in the present disclosure that are not described in the claims are understood as being optional operations.

REFERENCE SIGNS LIST 1 accelerometer
2 reflector
3 optical member
4 3D display device
10 movable object
41 communicator
42 controller
43 display panel
44 illuminator
45 parallax barrier
VaL left viewable area
VaR right viewable area
100 head-up display system
451 transmissive area
452 attenuation area
A active area
L optical path
V virtual image plane
V1 first virtual image plane
V2 second virtual image plane
Pg subpixel group
P1 to P10 subpixel
s barrier area
sg barrier area group

The invention claimed is:

1. A head-up display system, comprising:
a three-dimensional display device including
a display panel configured to display a parallax image,
an optical element configured to define a traveling direction of image light emitted from the display panel, and
a controller;
an optical member at a fixed position relative to the three-dimensional display device, the optical member being configured to reflect the image light from the three-dimensional display device toward a user's eye; and
an accelerometer configured to detect acceleration of the three-dimensional display device, wherein the controller controls a position of the parallax image on the display panel based on the acceleration.

2. The head-up display system according to claim 1, wherein
the controller calculates a displacement of the three-dimensional display device based on the acceleration, estimates a displacement of the user's eye based on the acceleration, and controls the position of the parallax image on the display panel based on the displacement of the three-dimensional display device and the displacement of the user's eye.

3. The head-up display system according to claim 1, wherein
the controller controls the position of the parallax image based on a relative displacement of a virtual image plane relative to the user's eye, and the virtual image plane is viewable by the user with the image light.

4. The head-up display system according to claim 3, wherein
the controller changes the position of the parallax image on the display panel to change a position of a virtual image on the virtual image plane in a direction opposite to a direction of the relative displacement along the virtual image plane.

5. The head-up display system according to claim 3, wherein
the controller changes parallax of the parallax image to change a position of a stereoscopic image formed by the virtual image plane in a same direction as a direction of the relative displacement in a direction normal to the virtual image plane.

6. The head-up display system according to claim 2, wherein
the controller estimates the displacement of the user's eye to be a displacement delayed by a predetermined period from the displacement of the three-dimensional display device and at a predetermined ratio relative to the displacement of the three-dimensional display device.

7. A movable object, comprising:
a head-up display system, the head-up display system including
a three-dimensional display device including a display panel configured to display an image, an optical element configured to define a traveling direction of image light emitted from the display panel, and a controller, an optical member at a fixed position relative to the three-dimensional display device, the optical member being configured to reflect the image light from the three-dimensional display device toward a user's eye, and an accelerometer configured to detect acceleration of the three-dimensional display device, wherein the controller controls a position of the image on the display panel based on the acceleration.

* * * * *